United States Patent [19]
Carreiro et al.

[11] Patent Number: 5,561,824
[45] Date of Patent: Oct. 1, 1996

[54] STORAGE MANAGEMENT OF DATA FOR ENSURING COMMUNICATION OF MINIMAL LENGTH DATA

[75] Inventors: Paul P. Carreiro; Robert R. Fish, both of San Jose; David R. Nowlen, Morgan Hill; Duc T. Doan, Fremont; James T. Brady; Philip G. Bowser, both of San Jose, all of Calif.

[73] Assignee: International Business Machines Corporation, Armonk, N.Y.

[21] Appl. No.: 322,441

[22] Filed: Oct. 4, 1994

[51] Int. Cl.⁶ .................................................. G06F 13/38
[52] U.S. Cl. ................... 395/872; 341/51; 395/876; 395/888
[58] Field of Search .................... 341/51; 395/876, 395/888, 872

[56] References Cited

U.S. PATENT DOCUMENTS

| | | | |
|---|---|---|---|
| 4,929,946 | 5/1990 | O'Brien et al. | 341/87 |
| 5,226,156 | 7/1993 | MacLean, Jr. et al. | 395/600 |
| 5,237,675 | 8/1993 | Hannon, Jr. | 395/888 |
| 5,247,646 | 9/1993 | Osterlund et al. | 395/888 |
| 5,280,600 | 1/1994 | Van Maren et al. | 360/48 |
| 5,313,604 | 5/1994 | Godwin | 395/489 |
| 5,357,614 | 10/1994 | Pattisam et al. | 395/250 |
| 5,392,445 | 2/1995 | Takamoto et al. | 395/800 |
| 5,394,534 | 2/1995 | Kulakowski et al. | 395/439 |

*Primary Examiner*—Ken S. Kim
*Attorney, Agent, or Firm*—Benman Collins & Sawyer

[57] ABSTRACT

A method and apparatus for ensuring the communication of a minimal length data stream in a system including a host and a storage management device is provided. The method and apparatus includes first and second buffers for simultaneously receiving compressed data and the original data from the host. The system compares the length of the data in the first and second buffers. If the data has expanded, indicating that compressed data is longer than the original data, the original data is provided to the storage media. If the data has not expanded, indicating that the original data is longer than the compressed data, then the compressed data is provided to the storage media.

21 Claims, 4 Drawing Sheets

STORAGE MANAGEMENT OF DATA FOR ENSURING COMMUNICATION OF MINIMAL LENGTH DATA

BACKGROUND OF THE INVENTION

1. Field of the Invention

The present invention relates to management of data in a computer system and more particularly to the management of the storage of data within such a system.

2. Description of the Related Art

In a computer system, the management of the storage of data is critical to provide for the efficient movement of data in the system. The computer system includes a central processing unit (CPU) and a host storage system. In such a system, a compressor is utilized to efficiently store information in the host storage system. Sometimes, data records which pass through the compressor may result in data expansion. Occasionally, byte strings under on-the-fly compression actually expand such as where the byte strings are encrypted.

Compression of English language plain text relies upon a skewed symbol probability distribution. However, encryption confounds the symbol probability distribution by rendering it flat or uniform. Expansion or contraction of a byte string is measured at the compressor output. (The length of the compressed data is larger than the original data). Two problems arise from this expansion. The first is there may not be enough space to store the expanded data on the media. The second is that for the transmission of multiple records some of the records may expand and some of the records may compress.

Accordingly, recovery actions are required to affect the performance of the computer system which are complex. Hence, to recover the data, either the data must be retransmitted or decompressed. Both of these recovery procedures significantly increase the latency period of the computer system.

In addition, if multiple records are being transferred in a single command, then the recovery action will have to occur on each data record produced. Accordingly, what is needed is a method and apparatus which allows for the efficient movement of data in a computer system. The system should be one which assures the recording and communication of a minimal length data among a CPU and host storage system. This assurance must be accomplished without increasing the latency period of the computer system. The present invention addresses such a need.

SUMMARY OF THE INVENTION

The present invention relates to a method and apparatus for assuring the recording and communication of minimal length multi-record organized byte strings between at least one subsystem and an attaching host. In a system in accordance with the present invention, two paths for the data transfer are provided. One path is used for compressed data and the other path for uncompressed data. Both paths may operate simultaneously.

This allows selection of the smaller of the compressed data or uncompressed data without the performance penalty involved with the other recovery actions. Hardware is provided to indicate the status of which of the records have been compressed and which of the records have been expanded. At the completion of the selection the data stream within the buffer which contains the smaller data length is provided to the storage media. The system allows for the smaller of the compressed data or uncompressed data to be selected without the performance penalty involved with the other recovery actions such as having to retransmit or decompress the data from the channel.

In one aspect of the present invention, a central processing unit (CPU) sends a write command and a byte string to a first subsystem. The first subsystem applies the string concurrently to a compressor and a buffer. The minimal length one of the two strings is selected and either recorded or sent to a host storage subsystem with an appended descriptor. The selection is a function of whether the compressed record string expands over the uncompressed version. Upon readback from a storage medium, the string is either being decompressed and then staged to the host/cache or staged to the host/cache directly as a function of the descriptor.

DESCRIPTION OF THE INVENTION

The present invention relates to the improvement in the management of the storage of data in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
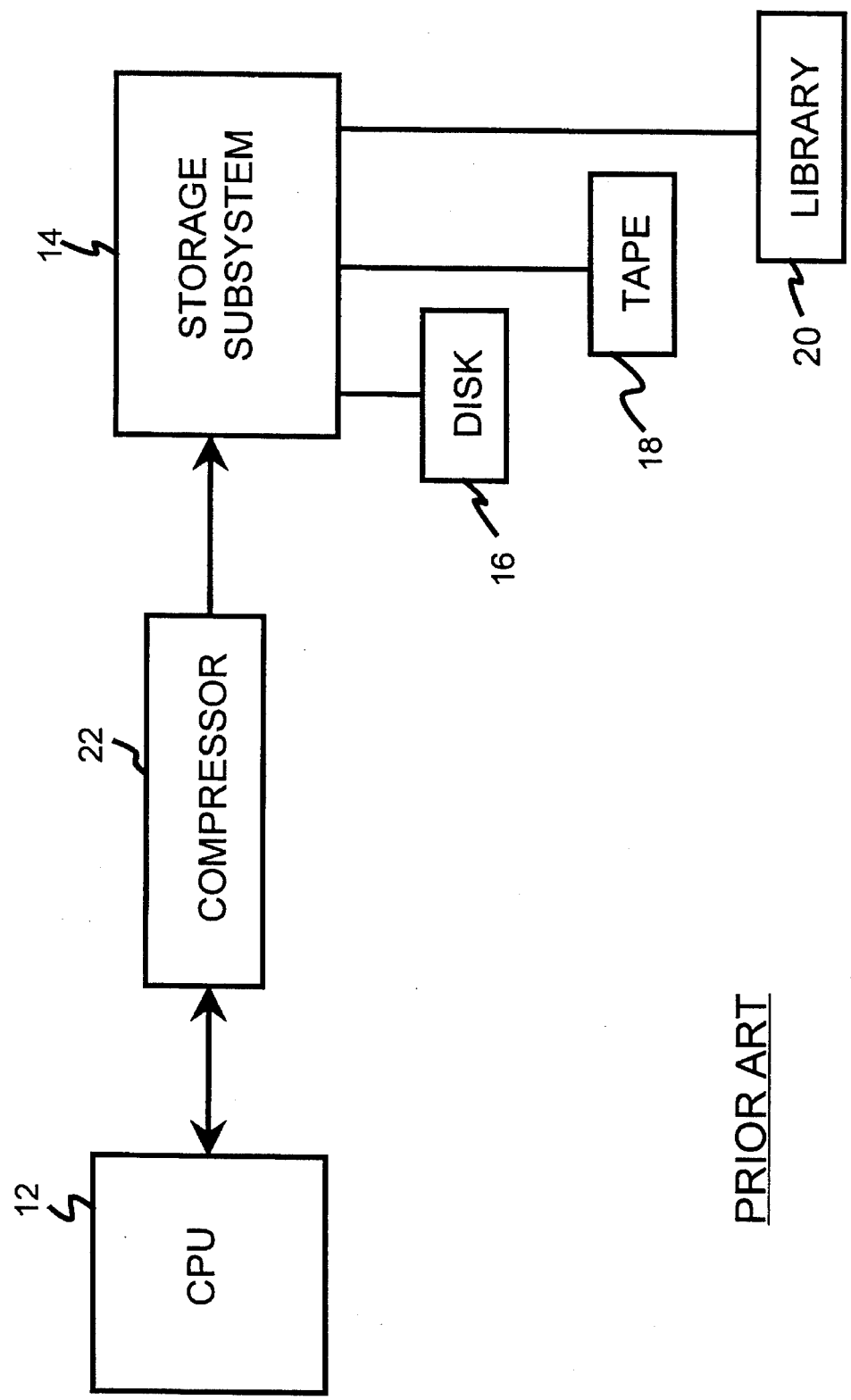
FIG. 1 is a block diagram of a computer system.

FIG. 1 is a block diagram of a computer system 10. The computer system 10 includes a host central processing unit (CPU) 12 and at least one storage subsystem 14. It should be understood that although only one storage subsystem 14 is shown, there would likely be a plurality of storage subsystems 14 associated with the host CPU 12, and these would be within the spirit and scope of the present invention. The storage subsystem 14 includes a plurality of storage units such as a disk 16, tape 18 and a library system 20. The host CPU 12 and storage subsystem 14 exchange data therebetween. The storage subsystem 14 oftentimes will also receive compressed data from the CPU 12 through a compressor 22.

As has been before-mentioned, the data that passes through the compressor 22 can expand. As has also been before-mentioned, there may not be enough space on the storage media, and in multi-record systems, there may be no way to determine which records are compressed and which are expanded. The present invention provides a system for detecting such expansion and then controlling the data stream such that the shortest data stream can be stored in the storage unit. To more specifically describe such a system, refer now to FIG. 2 and the following discussion.

Figure 2:
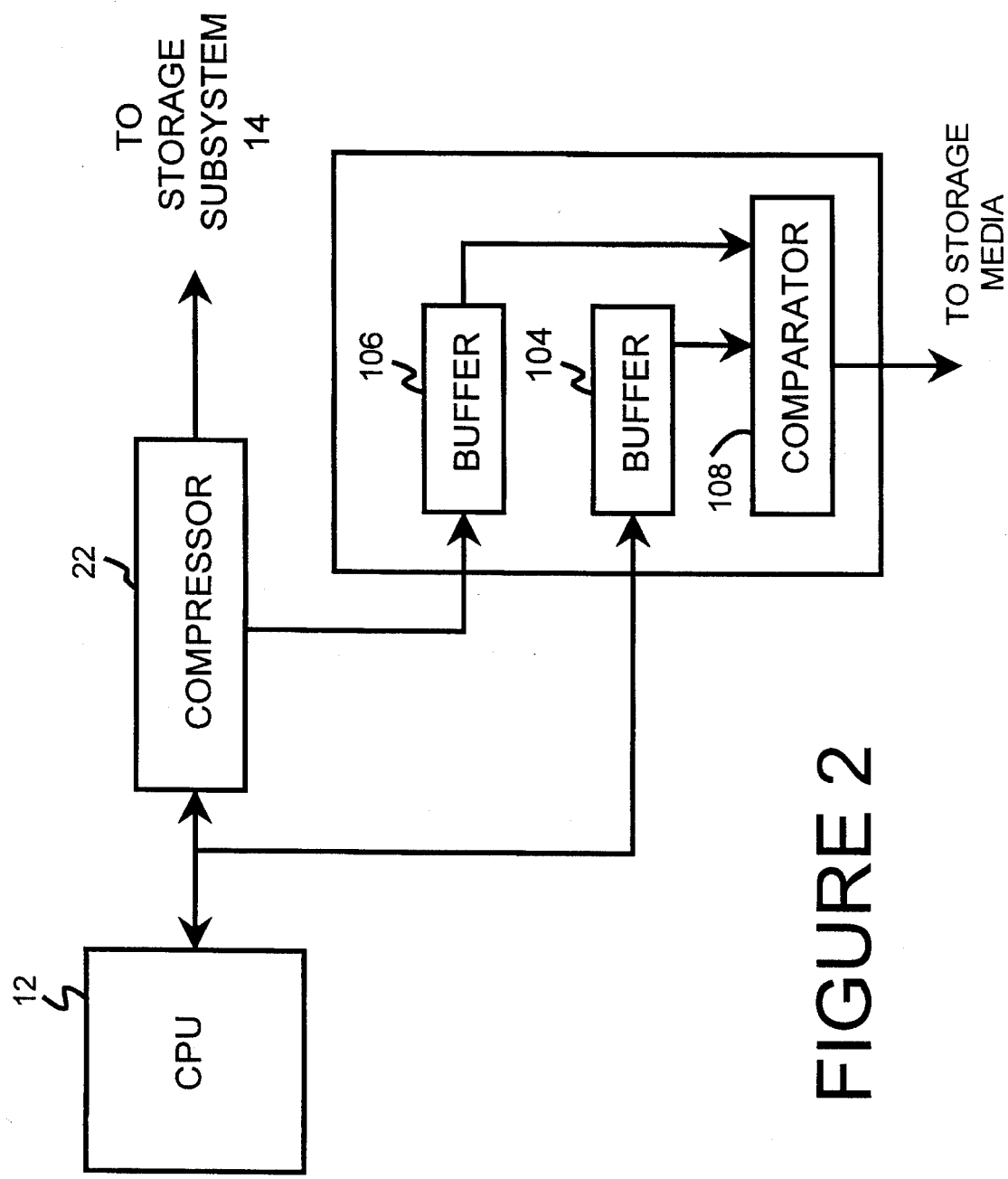
FIG. 2 is a block diagram of a storage management system in accordance with the present invention.

What is shown in FIG. 2 is a simplified block diagram of an expansion detection system 100 in accordance with the present invention. The expansion detection system 100 provides for the compressor 22 to provide to compress data to buffer 106, and the original data from the host CPU 12 provides uncompressed data to buffer 104. Thereafter, the length of the two data streams (compressed and uncompressed) are compared in comparator 108 to determine which is smaller. If it is determined that the compressed data stream is smaller than the original data stream, then the contents of buffer 106 are retained and the original data stream in buffer 104 is deallocated. Finally, data also is appended to the data stream indicating that the data is compressed.

On the other hand, if the data is larger in buffer 106 indicating that the data has expanded, then the data from buffer 104 is retained and the data stream in buffer 106 is deallocated. Finally, data is appended to the data stream indicating that the data is not compressed.

The following provides a detailed discussion of some of the hardware elements and their interactions in a preferred embodiment of the present invention. Accordingly, to more particularly describe the advantages of the present invention, refer now to FIG. 3 and the following discussion. The hardware of the present invention will be described in the context of a particular environment. It should be understood, however, that many of the features described hereinbelow could be modified, and those modifications would be within the spirit and scope of the present invention.

Figure 3:
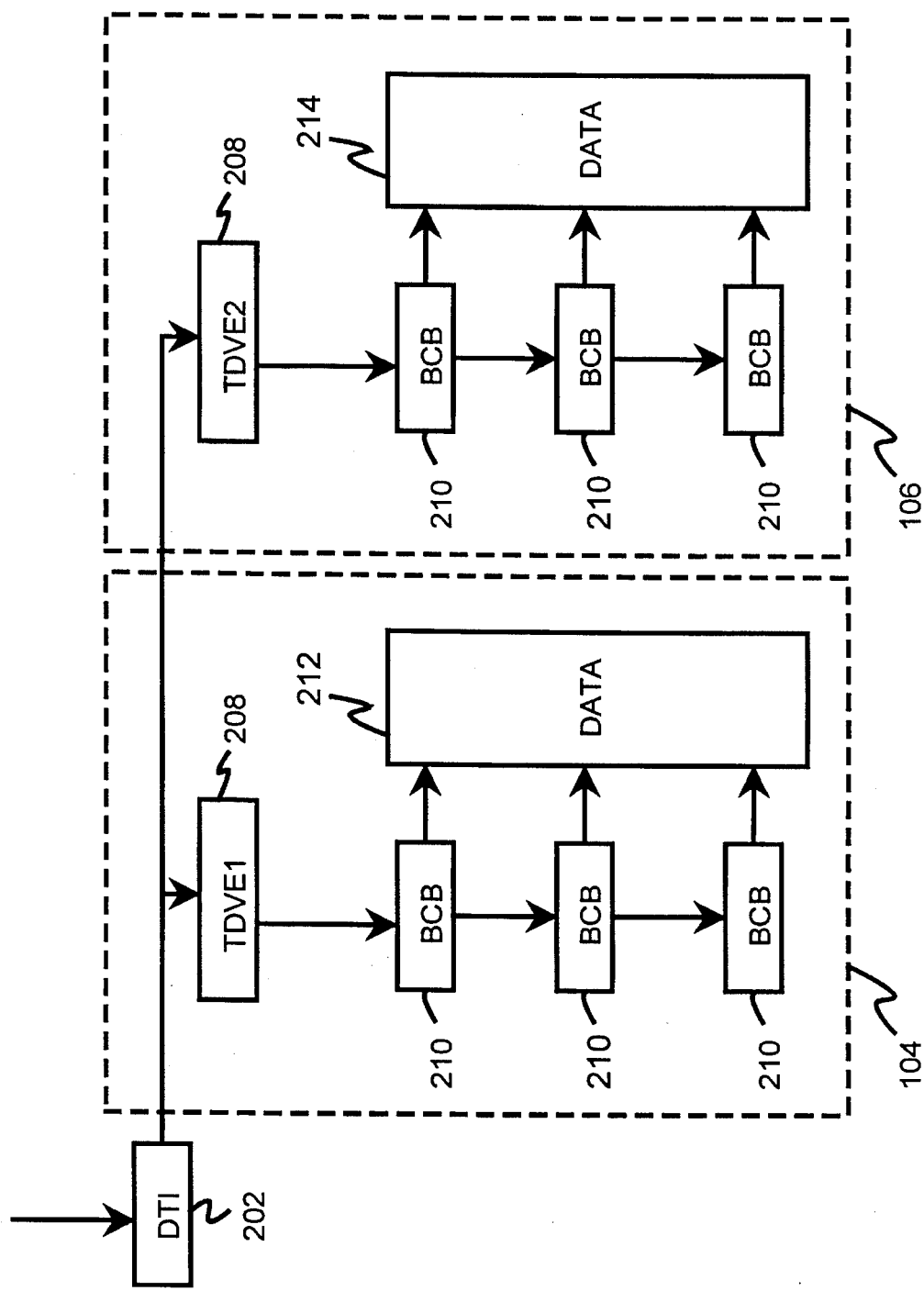
FIG. 3 is a detailed block diagram of the hardware of the storage management system in accordance with the present invention.

FIG. 3 is a high level description of the control blocks in a system in accordance with the present invention which is utilized to detect the expansion of data. After the data is received, an interrupt is generated. As part of the interrupt being generated, a pointer is provided to an interrupt status block. A data transfer indicator DTI 202 associated with the interrupt status block then indicates whether the data stream has been expanded. In a preferred embodiment, the DTI 202 includes a pointer to allow for the tracking of track descriptor vector elements (TDVE 208) of the data stream.

Each of the TDVEs 208 is utilized to provide an indication of which record has expanded. It should be understood that although this function is described in a specific manner, a wide variety of devices can perform the functions of the TDVE 208. Their use would be within the spirit and scope of the present invention.

Each TDVE 208 has, in a preferred embodiment, one bit that indicates that the expansion has been detected. The buffer control blocks (BCBs) 210, 211, and 213 all point to where the data is located. Typically, the BCB 210 chains point to first and second images of data 212 and 214, that are located in buffers 104 and 106, respectively (SIP and DIP).

In this embodiment, Data_Input_Port (DIP) is the buffer 106 and the Small_Input_Port (SIP) is the buffer 104. DIP buffer 106 is a full function input port. It supports the data structures associated with a normal data transfer operation as required by the storage subsystem 14. SIP buffer 104 (as the name small implies) buffer is typically an abbreviated version of DIP buffer 106. SIP buffer 104 provides for hardware buffer allocation.

Data_Transfer_Indicators (DTI) 202

The DTI 202 register is used to store various data transfer status indicators which result in completion interrupts being sent to the software. In some cases the ISB is "informative" only and does not transfer control to the software (hardware automatically proceeds to complete the transfer without needing any software intervention). In some cases the status indicators represent interim events, but data transfer is paused and control is temporarily transferred to software. Software can resume the transfer, or terminate it by issuing the appropriate order. In other cases the data transfer has completed, and the DTI 202 contains the final status indicators.

In this embodiment, a DTI bit is utilized to determine if expansion has occurred (Expanded_Record_Detected). For any write operation, Expanded_Record_Detected will be set if ANY field processed by the Compressor expands (i.e. the first occurrence of setting Data_Expansion_Detected bit in a TDVE will also set Expanded_Record_Detected). This bit is stored only in the ISB DTI field, and is used by software to determine if expansion recovery is needed for the transfer.

Write Operations

Write operations are characterized as having a source of the data, and a Data Store memory, or Operand Store memory as the destination of the data. The DIP buffer 106 is programmed with the appropriate control block structure, to indicate how many records, and fields must be requested from the source. A Start_DIP buffer 106 order is used to initiate the write operations.

General Write Operation Controls

For all write operations involving a single record operation, a single TDVE 208 is used and the Start_TDVE 208 and End_TDVE 208 are specified to point to a single TDVE 208. Multiple record transfer write operations utilized one TDVE 208 per record. For multiple records Start_TDVE 208 will be initialized to the first TDVE 208 to be transferred and End_TDVE 208 will be initialized to the last record.

TDVE 208 for DIP buffer 106/SIP buffer 104

In a preferred embodiment, management of the TDVE 208 is shared between hardware and software. Software has the responsibility for initialization of the TDVE 208, while hardware, based on these initialized values, will modify and update the various fields.

Refer to Table 1 to which shows the status of the DIP buffer 106, SIP buffer 104, and the TDVE 208 register and the functional description of each of the status settings.

TABLE 1

| DIP/SIP_ Routing Enable SIP | Enable DIP Compression | TDVE 208 Flag Compressed Field | Functional Description |
| --- | --- | --- | --- |
| 0 | 0 | 0 | DIP receives uncompressed data and SIP is not enabled for data transfer. (Single Path with no compression). |
| 0 | 0 | 1 | Hardware will generate a SA Completed A B Normal ISB. Status will include Invalid Control Block. |

TABLE 1-continued

| DIP/SIP_ Routing Enable SIP | Enable DIP Compression | TDVE 208 Flag Compressed Field | Functional Description |
|---|---|---|---|
| 0 | 1 | 0 | DIP receives uncompressed data and SIP is not enabled. (Single Path with no compression). |
| 0 | 1 | 1 | DIP receives compressed data and SIP is not enabled. (Single Path with compression). |
| 1 | 0 | 0 | Hardware will generate a SA Completed A B Normal ISB. Status will include Invalid Control Block. |
| 1 | 0 | 1 | Hardware will generate a SA Completed A B Normal ISB. Status will include Invalid Control Block. |
| 1 | 1 | 0 | Both DIP and SIP are enabled for data transfer. (Dual Path with compression). DIP receives uncompressed data and SIP receives compressed data. |
| 1 | 1 | 1 | Both DIP and SIP are enabled for data transfer. (Dual Path with compression). DIP receives compressed data and SIP receives uncompressed data. |

First BCB 210

The First_BCB pointer contains the address of the first chained BCB which then points to the buffer with the first part of this record.

SIP buffer 104 First BCB 210

This field is similar to the First_BCB field, but it is used by hardware for allocation of BCBs for the SIP buffer 104.

SIP buffer 104 Field Length

This field contains the length of data controlled by SIP buffer 104. It is updated by SIP buffer 104 at the same time DIP buffer 106 would have updated Field_Length with the compressed counts.

Figure 4:
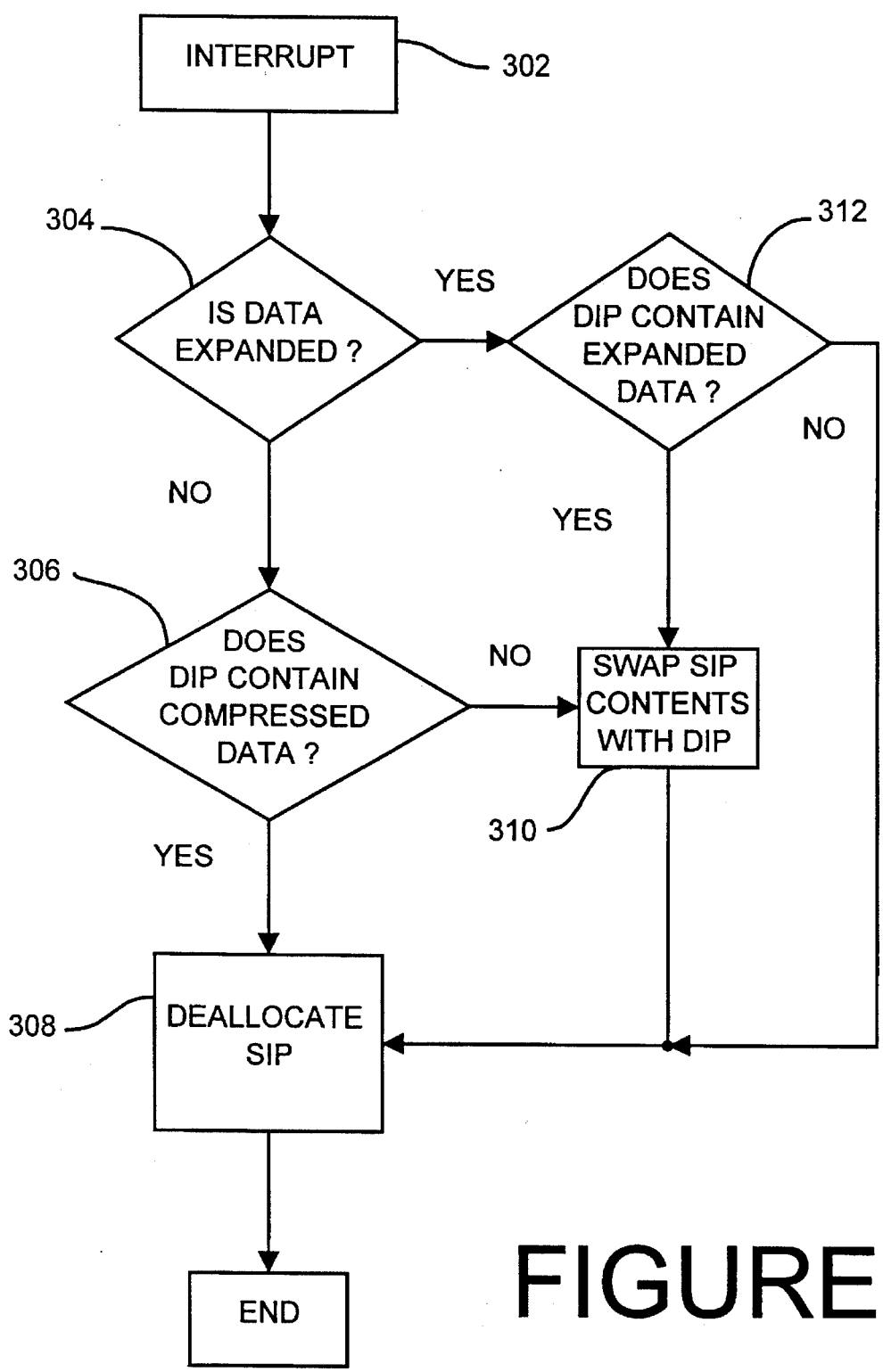
FIG. 4 is a flow chart of the operation of the software of the storage management system in accordance with the present invention.

To more fully understand the operation of the software of the present invention, refer now to FIG. 4. What is shown in FIG. 4 is a flow chart of the operation of software or software after the hardware has provided an indication of whether expansion has taken place, indicating that data resides in the storage system through the compressor 22.

As can be seen after an interrupt has taken place via step 302, it must be determined through examination of the appropriate bits whether data has expanded, via step 304. If no data has expanded, then it must be determined if the DIP buffer 106 contains the compressed data, via step 306. If the DIP buffer 106 contains the compressed data then the SIP buffer 104 can be deallocated, via step 308. If on the other hand the DIP buffer 106 does not contain the compressed data, then the SIP buffer 104 must be used, via step 310 and then the DIP buffer 106 is deallocated, via step 314.

If on the other hand data is expanded, via step 304, then it must be determined whether the DIP buffer 106 contains the expanded data via step 312. If the DIP buffer 106 does not contain the expanded data, this indicates that SIP buffer 104 contains the expanded data and the SIP buffer 104 is deallocated, via step 308. If on the other hand, the DIP buffer 106 does contain the expanded data, then the pointers of the SIP buffer 104 must be used, via step 310. Then, the DIP buffer 106 is deallocated, via step 314.

As you can see from the above, the data stored by SIP buffer 104 should be used for recovery when software has discovered that:

DIP buffer 106 is controlling compressed data and the data has expanded or,

DIP buffer 106 is controlling uncompressed data and the data is compressed. In a preferred embodiment, for recovery of data transfers containing expanded data, where the desired data was controlled by SIP, software will simply remove the buffer pointers associated with the expanded data and link in the new buffer pointers associated with SIP buffer 104.

Compression and Decompression

For recovery of transfers containing expanded data, where the desired data was controlled by SIP buffer 104, the software must modify the TDVE 208 to reflect the SIP buffer 104 transfer (hardware will always leave the TDVE 208 settings reflecting the DIP buffer 106 transfer). In a preferred embodiment, the following updates must be accomplished:

Remove and free the chain of BCBs used by DIP buffer 106 for the data transfer.

Link the chain of BCBs used by SIP buffer 104 into the chain of BCBs (if any) for this TDVE 208.

Field_Descriptor_Flags.Compressed_Field. This field is set to indicate compression if SIP buffer 104 was controlling the compressed data and set to indicate no compression if SIP buffer 104 was controlling the uncompressed data.

Field_Length. Set Field_Length with the value contained in SIP_FIELD_3_LENGTH if SIP buffer 104 was controlling the uncompressed data. Field_3_Length is loaded with the value contained in SIP buffer 104_Field_3_Length if SIP buffer 104 was controlling the compressed data. Use of data stored by SIP buffer 104 may also require software recovery with other associated subsystems.

Accordingly, a system is provided in accordance with the present invention that allows for the detection of the expansion of a data on the fly without incurring any additional latency period. Through hardware and software interaction, the data is compared in compressed and uncompressed form and the lengths of the compressed and original data are compared to determine if the compressed data has expanded. Accordingly, if the data is expanded, then the original data is stored in the storage media. On the other hand, if the data is not expanded, then the compressed data is stored in the storage media.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. In a system including a host, at least one storage subsystem, the storage subsystem including at least one storage media, a compressor coupled between the at least one storage subsystem and the host for compressing data transferred therebetween; a system for ensuring the communication of the minimal length data stream to the storage subsystem comprises:

descriptor means coupled to the compressor and the host for providing an indication that the data stream has been compressed;

first buffer means coupled to the descriptor means for receiving an original data stream from the host;

second buffer means coupled to the compressor for receiving a compressed data stream from the compressor;

means coupled to the first and second buffer means for comparing the length of the original data stream to the compressed data stream and swapping data from the first buffer means with data in the second buffer means when the first buffer means data is shorter in length; and means coupled to the comparing means for providing the shorter length of the data stream and the compressed data stream to the at least one storage media from the second buffer means.

2. The system of claim 1 in which the first buffer means comprises:

a first plurality of control devices coupled to the descriptor means for receiving the data stream from the host; and first storage means coupled to the first plurality of control devices for receiving the data stream from the plurality of control devices.

3. The system of claim 2 in which the second buffer means comprises:

a second plurality of control devices coupled to the descriptor means for receiving the compressed data stream from the compressor; and second storage means coupled to the second plurality of control devices for receiving the compressed data stream from the plurality of control devices.

4. The system of claim 3 in which the first and second plurality of control devices comprises buffer control blocks.

5. The system of claim 1 in which the first buffer means comprises a small input port (SIP) buffer.

6. The system of claim 5 in which the second buffer means comprises a data input port (DIP) buffer.

7. The system of claim 6 in which the SIP buffer comprises an abbreviated version of the DIP buffer.

8. The system of claim 1 in which the descriptor means comprises:

a data transfer indicator (DTI) means for indicating whether an expansion has been detected; and a plurality of descriptor elements coupled to the DTI means for indicating which portion of the data stream has expanded.

9. The system of claim 1 in which the comparing means further comprises:

expansion detection means coupled to the first and second buffer means for determining whether the compressed data stream has expanded;

first compression data means responsive to the expansion detection means for determining whether the compressed data stream is within the second buffer means;

first data stream sending means responsive to first compression data means for providing the compressed data stream from the second buffer means to the storage medium;

second data stream sending means responsive to the first compression data means for providing the compressed data stream located within the first buffer means to the storage medium;

first expansion data means responsive to the expansion detection means for determining whether the expanded data stream is within the second buffer means;

third data stream sending means responsive to the first expansion data means for providing the data stream located within the first buffer means to the storage medium; and fourth data stream sending means responsive to the first expansion data means for providing the data stream from the second buffer means to the storage medium.

10. The system of claim 9 in which first data stream sending means further comprises means responsive to first compression data means for deallocating the first buffer means.

11. The system of claim of claim 9 in which fourth data stream sending means further comprises means responsive to first expansion data means for deallocating the first buffer means.

12. The system of claim 9 in which the second data stream sending means further comprises:

means for swapping the compressed data stream located within the first buffer means with the data stream located in the second buffer means; and means responsive to the compressed data swapping means for deallocating the first buffer means.

13. The system of claim 9 in which the fourth data stream sending means further comprises:

means for swapping the data stream located within the first buffer means with the expanded data stream located in the second buffer means; and mean responsive to the expanded data swapping means for deallocating the first buffer means.

14. In a system including a host, at least one storage subsystem, the storage subsystem including at least one storage media, a compressor coupled between the at least one storage subsystem and the host for compressing data transferred therebetween; a method for ensuring the communication of the minimal length data stream to the storage subsystem comprises the steps at the subsystem of:

(a) providing an indication that the data stream has been compressed;

(b) receiving an original data stream from the host in a first buffer means;

(c) receiving a compressed data stream from the compressor in a second buffer means;

(d) comparing the length of the original data stream to the compressed data stream and swapping data from the first buffer means with data in the second buffer means when the first buffer means data is shorter in length; and (e) providing the shorter length of the data stream and the compressed data stream to the at least one storage media from the second buffer means.

15. The method of claim 14 in which step (a) further comprises the steps of: indicating whether an expansion of the data stream has been detected; and indicating which portion of the compressed data stream has expanded.

16. The method of claim 14 in which the comparing step (d) further comprises the steps of:

(d1) determining whether the compressed data stream has expanded;

if the compressed data stream has not expanded;

(d2) determining whether the compressed data stream is within the second buffer means;

if the compressed data stream is within the second buffer means;

(d3) providing the compressed data stream from the second buffer means to the storage medium;

if the compressed data stream is within the first buffer means;

(d4) swapping the compressed data stream located within the first buffer means with the data stream located in the second buffer means; and deallocating the first buffer means;

if the compressed data stream has expanded (step d1);

(d5) determining whether the expanded data stream is within the second buffer means;

if the expanded data stream is within the second buffer means;

(d6) swapping the data stream located within the first buffer means with the data stream located in the second buffer means; and deallocating the first buffer means; and if the expanded data stream is within the first buffer means;

(d7) providing the data stream from the second buffer means to the storage medium.

17. The method of claim 16 in which step d3 further comprises the step of deallocating the first buffer means.

18. The method of claim 16 in which step d7 further comprises the step of deallocating the first buffer means.

19. In a system including a host accessing byte strings of at least one record in length resident among at least one of a plurality of attached peer-coupled storage subsystems, a method for managing minimal length byte string communication on the fly within a data patch between the host and a storage medium portion of the subsystem and among peer coupled subsystems, comprising the steps at the subsystem of:

(a) responsive to a write access from the host, ascertaining whether the access is an update of a previously recorded byte string, if not, concurrently applying the byte string to a compressor and to a buffer;

(b) responsive to a write access not updating a byte string recorded in the subsystem comparing the length of the first record of the byte string under compression with the original record stored in the buffer and selecting the minimal length one of the two strings based on the minimal length of the first record, appending a descriptor indicative of the compression status to the selected string, and either recording the selected string and the descriptor in a storage medium or communicating the same to a peer coupled subsystem; and (c) responsive to a write access updating a byte string recorded in the subsystem, concurrently applying the byte string to the compressor and the buffer, selecting the minimal length string from the compressor or the buffer according to the descriptor of the byte string being updated.

20. The method according to claim 19, wherein the method further comprises the steps of:

(d) responsive to a read access from the host, extracting the recorded string and descriptor from the storage medium, and responsive to the compression status indicator either staging the accessed string to the host directly or expanding the string to its uncompressed length and then staging it to the host.

21. A computer readable medium containing program instructions for ensuring the communication of a minimal length data stream between a host and at least one storage subsystem, the program instructions comprising:

providing an indication by a descriptor that the data stream has been compressed by a compressor, the compressor coupled between the host and the at least one storage subsystem;

receiving the data stream in a first buffer, the first buffer coupled to the descriptor;

receiving the compressed data stream from the compressor in a second buffer;

comparing the length of the data stream in the first buffer to the compressed data stream in the second buffer and swapping the data stream from the first buffer with data in the second buffer when the first buffer data stream is shorter in length; and (e) providing the shorter length of the data stream and the compressed data stream to the at least one storage subsystem from the second buffer means.

* * * * *